US005635282A

United States Patent [19]

Suess et al.

[11] Patent Number: 5,635,282

[45] Date of Patent: Jun. 3, 1997

[54] EMBOSSING FOIL

[75] Inventors: Joachim Suess; Edwin Tafelmeier, both of Fuerth, Germany

[73] Assignee: Leonhard Kurz GmbH & Co., Fuerth, Germany

[21] Appl. No.: 912,555

[22] Filed: Jul. 13, 1992

[30] Foreign Application Priority Data

Aug. 24, 1991 [DE] Germany ............................ 9110511 U

[51] Int. Cl.[6] ........................................ B32B 9/00

[52] U.S. Cl. ........................ 428/195; 428/913.3; 428/201; 428/202; 428/343; 428/354; 428/480; 428/914

[58] Field of Search ................................ 428/913.3, 914, 428/195, 201, 202, 343, 354, 480

[56] References Cited

U.S. PATENT DOCUMENTS

| | | | |
|---|---|---|---|
| 4,330,352 | 5/1982 | Grimes et al. | 428/914 |
| 4,631,222 | 12/1986 | Sander | 428/914 |
| 4,759,968 | 7/1988 | Janssen | 428/202 |
| 4,837,072 | 6/1989 | Kraetschmer | 428/914 |
| 4,892,602 | 1/1990 | Oike et al. | 156/233 |
| 5,053,260 | 10/1991 | Brehm | 428/914 |

*Primary Examiner*—Patrick Ryan
*Assistant Examiner*—Cathy F. Lam
*Attorney, Agent, or Firm*—Louis E. Marn

[57] ABSTRACT

An embossing foil has three-dimensional patterning which does not extend uniformly over the entire surface of the foil but only over regions thereof. The region-wise three-dimensional patterning can be produced by the surface of the backing film, which is three-dimensionally patterned throughout, being covered in a region-wise manner with a lacquer forming a smooth surface, or by a thermoplastically deformable layer being provided in the interior of a decorative lacquer layer on the embossing foil, the surface of the thermoplastically deformable layer being three-dimensionally patterned only in a region-wise manner.

10 Claims, 2 Drawing Sheets

EMBOSSING FOIL

BACKGROUND OF THE INVENTION

This invention relates generally to embossing foils and more particularly but not exclusively to hot enbossing foils.

In one form comprising a backing film and a decorative lacquer layer which can be released from the backing film and which has an adhesive layer at the side remote from the backing film, and possibly a release layer between the backing film and the decorative lacier layer, a reflective layer between the decorative lacquer layer and an adhesive layer and/or a bonding layer between the decorative lacquer layer and the backing film, either the backing film is provided with a three-dimensional patterning on a surface which carries the decorative lacquer layer, or the decorative lacquer layer has at least one transient cover lacquer layer which faces towards the backing film and which is provided with a three-dimensional patterning on its surface which is remote from the backing film.

Hitherto the practice has been to provide three-dimensional patterning on certain surfaces of an embossing foil only when the situation involved producing substantially the same image configuration over the entire surface of a substrate, which was to be decorated with the foil. For that purpose, the procedure adopted was such that the surface of the backing film carrying the decorative lacquer layer was roughened up for example by brushes or in some other fashion before the decorative lacquer layer was applied. The result obtained in that case, in relation to a substrate decorated with such an embossing foil, is a surface which is roughed over its entire area and which is of the appearance for example of brushed metal.

Another option in this respect is that of providing a transparent cover lacquer layer for the decorative lacquer layer of the embossing foil. That cover lacquer layer is provided at its surface remote from the backing film, over the whole thereof, with a three-dimensional or spatial patterning effect, as indicated above. When using an embossing foil of that configuration, the substrate which is decorated therewith has a smooth surface. Nonetheless, the impression given is that of a corresponding three-dimensional patterning effect or matt finish.

However, as already indicated above, a common aspect in relation to all such embossing foils is that the whole of the surface is substantially uniformly and equally patterned, so that for example there is a brush effect over the whole thereof.

SUMMARY OF THE INVENTION

An object of the present invention is to provide an embossing foil which can avoid the limitation of uniform patterning thereon.

Another object of the present invent ion is to provide an embossing foil which affords greater configurational options in terms of three-dimensional patterning.

Still another object of the present invention is to provide a hot embossing foil which is such that it can readily provide for variations in its patterning effect.

The foregoing and other objects are attained by an embossing foil in accordance with the invention as set forth herein.

In contrast to the previous embossing foils and more especially hot embossing foils as discussed above, foils according to the invention do not involve a substantially uniform three-dimensional patterning effect over the entire surface thereof. On the contrary, the surface of the embossing foil and correspondingly also that of the substrate decorated therewith have different regions, more specifically regions which are provided with a three-dimensional patterning effect in the usual fashion, and further regions which do not involve any such patterning effect but which are for example substantially smooth. That therefore gives what is virtually a negative patterning effect in the three-dimensionally patterned surface of the embossing foil or the substrate which is decorated therewith. For example, the impression given may be as though only parts of the surface have been brushed while other regions of the surface were missed out in the brushing operation. Such a surface configuration cannot be achieved with conventional methods, that is to say for example by actually brushing the surface, in a large-scale technical procedure. A corresponding patterning effect could only be achieved in that respect by manual work, which however cannot be considered as a viable proposition for most situations of use, because of the high level of cost that that would involve. If in contrast a foil according to the invention is used, the patterning effect can be produced in a simple fashion using a conventional embossing procedure and more especially hot embossing procedure, without the need to take special steps in that respect and without requiring special machinery.

Manufacture of such an embossing foil with a three-dimensional patterning effect which is provided only in a region-wise manner can be effected in a particularly simple manner if the surface of the backing film of the embossing foil, which overall has a three-dimensional patterning effect, for the purposes of producing regions which have no three-dimensional patterning, is covered in those regions with a covering lacquer layer which forms a smooth surface and which in the embossing process can be released not from the backing film but from the decorative lacquer layer. That involves a first embodiment of an embossing foil in accordance with the invention. The layer of lacquer which serves for partially masking the three-dimensionally patterned surface of the backing film may be applied for example by a printing operation, which is a simple operation to effect.

Furthermore, in regard to an embossing foil of that kind, it may be provided that in the regions in which there is a covering lacquer layer, the release layer is disposed between the covering lacquer layer and the decorative lacquer layer. If there is a release layer between the covering lacquer layer and the decorative lacquer layer, that arrangement will nonetheless ensure, even in relation to covering lacquers which do not adhere very firmly to the patterned backing film, that the covering lacquer layer remains adhering to the backing film upon transfer of the embossing foil, and only the decorative lacquer layer is released. It will be appreciated that the release layer will be provided not only in the regions in which there is the covering lacquer layer but generally over the entire surface of the foil, that is to say also in the region of the surface of the backing film, which comes directly into contact with the decorative lacquer layer. Furthermore, when using a release layer, it is possible suitably to choose the release layer in such a way as to influence the appearance and aspect of the free surface of the embossing foil after it has been transferred on to the substrate, for example the shine thereof.

In a second basic configuration according to the present invention, the surface of the transparent covering lacquer layer which faces away from the backing film is provided in a region-wise manner with the three-dimensional patterning by means of hot deformation. An embossing foil of that nature can be particularly easily produced by simply employing a pressing or embossing roller which is patterned, for example engraved, only in a region-wise manner thereon, in order therewith suitably to deform the transparent and thermoplastic cover lacquer layer.

In order further to emphasise the impression of a three-dimensional patterning effect in an embossing foil of this second kind, it is possible to operate in such a way that the surface of the transparent cover lacquer layer, which has three-dimensional patterning in a region-wise manner, is provided with a reflective layer, for example and preferably a metal layer.

In accordance with a further preferred feature of the invention the surface of the decorative lacquer layer which faces towards the backing film may be formed by a preferably transparent protective lacquer layer which resists damage to the decorative lacquer layer after the embossing foil has been applied to a substrate. The protective lacquer layer may be a separate layer but it may also serve for example at the same time as the transparent cover lacquer layer.

Further objects, features and advantages of the invention will be apparent from the following description of preferred embodiments.

DESCRIPTION OF PREFERRED EMBODIMENTS

Figure 1:
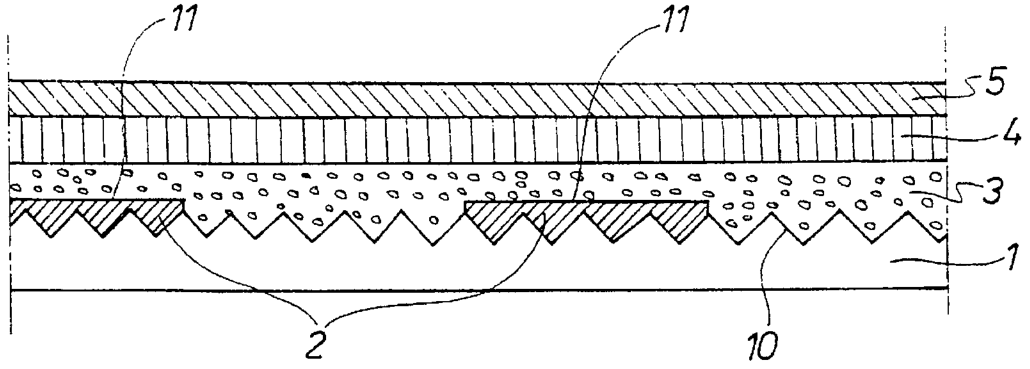
FIG. 1 is a view in section through a first embodiment of a hot embossing foil according to the invention.

Referring firstly to FIG. 1, a hot embossing foil in accordance with the present invention as illustrated therein comprises the following layers:

Reference numeral 1: a backing film comprising a polyester film of a thickness of 12 through 100 μm, preferably 19 through 38 μm.

Reference numeral 2: a covering lacquer layer which is provided only in a region-wise manner where the finally decorated substrate is not to have any three-dimensional patterning effect. The covering lacquer layer is a layer of lacquer of a thickness of 5 through 15 μm, preferably 10 μm, with the thickness of the layer being dependent on the desired effect. The lacquer used for this layer must exhibit particular properties, namely very good adhesion to the backing film, very good resistance to solvents, including ketones and aromatics, and very good temperature resistance of generally more than 180° C. The lacquer is applied by a conventional procedure, for example by means of screen printing or by means of intaglio printing.

Reference numeral 3: a protective laquer layer in a thickness of 0.5 through 2.5 μm, preferably about 1.5 μm. The protective lacquer layer serves to protect the free surface of the substrate which is decorated with the embossing foil, in use thereof. For that purpose it must exhibit good hardness, good resistance to chemicals and good resistance to scratching and abrasion and can be readily released from the backing film. This protective layer is generally transparent.

Reference numeral 4: a decorative layer. This is a colored lacquer which is applied by a conventional process and is 2 through 20 μm and preferably about 6 μm in thickness. The layer 4 is responsible for coloration of the surface of the substrate when decorated with the embossing foil. The decorative layer rest have a good covering capacity, it must have good adhesion in relation to the protective lacquer layer 3 and it must enjoy good strength and durability.

Reference numeral 5: adhesive layer. Various adhesive materials can be used. This layer is 1 through 10 μm, preferably about 4 μm, in thickness. The adhesives used must exhibit good adhesiveness at the embossing temperature, good adhesion to the decorative layer 4 and naturally also good adhesion to the substrate after the enbossing operation.

Figure 2:
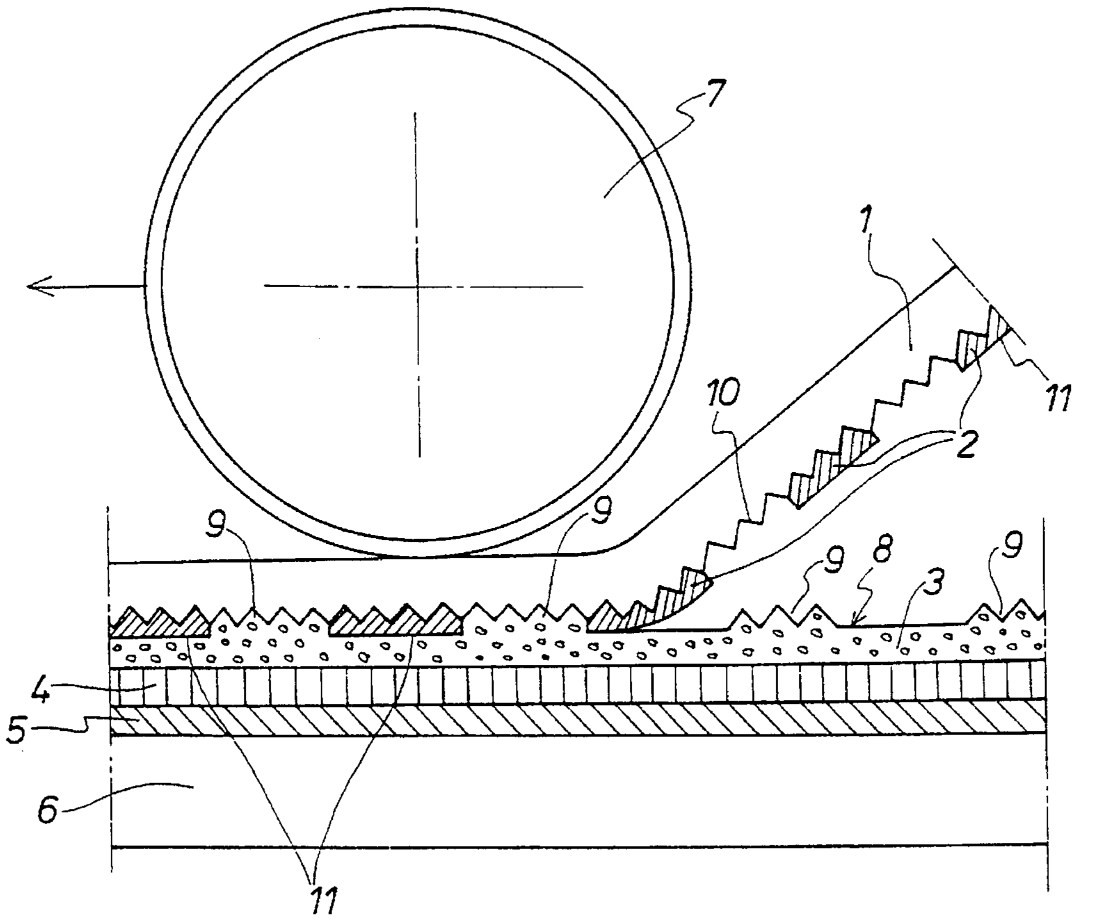
FIG. 2 is a view in section through a substrate with hot embossing foil thereon during the embossing operation.

FIG. 2 diagrammatically illustrates the embossing operation on a substrate as indicated at 6, for example a plate or the like. In that procedure, the embossing foil is generally pressed against the substrate 6 under the effect of heat and pressure, as symbolically indicated by the pressure roller 7. As a result, the adhesive layer 5 becomes sticky and ensures that the protective lacquer layer 3 and the colored lacquer layer 4 are suitably joined to the substrate 6. When the temperature has fallen somewhat, those two layers 3 and 4 stick to the substrate 6 by way of the adhesive layer 5 so firmly that the backing film 1 and jointly therewith the portions of covering lacquer layer 2 can be pulled off. What then remains is a surface as indicated at 8 on the substrate 6 which is decorated with the embossing foil, the surface 8 being provided in the regions indicated at 9 with a three-dimensional patterning which corresponds to the three-dimensional patterning 10 provided over the entire surface of the backing film 1. In the regions in which the backing film 1 is provided with the covering lacquer layer 2 however, the surface 8 of the decorated substrate 6 is substantially flat since, as FIG. 1 clearly shows, the covering lacquer layer 2 is also substantially flat at its surface 11 which faces away from the backing film 1.

The following materials may be used, by way of example, for the various layers of the foil shown in FIG. 1 and described above:

| | |
|---|---|
| Backing film 1: | |
| Polyester film, as described above. | |
| Covering lacquer layer 2: | |
| A lacquer of the following composition: | |
| Branched, hydroxyl group-bearing polyester (OH-content about 8%) | 35 parts |
| Polyfunctional aliphatic isocyanate (75% in BuAc/xylol 1:1; NCO-content about 17%) | 30 parts |
| Methylethylketone | 20 parts |
| Butylacetate | 15 parts |
| Protective lacquer layer 3: | |
| A lacquer of the following composition: | |
| Low-molecular weight methylmethacrylate with a high softening point (vitrification temperature (tg) about 105° C.) | 25 parts |
| Methylethylketone | 50 parts |

-continued

| | |
|---|---|
| Cyclohexanone | 10 parts |
| Wax dispersion (PE, about 17% in xylol) | 15 parts |
| Decorative lacquer layer 4: | |
| A lacquer of the following composition: | |
| Medium-molecular weight methylmethacrylate (tg about 85° C.) | 20 parts |
| Methylethylketone | 18 parts |
| Ethylacetate | 18 parts |
| Butylacetate | 10 parts |
| Pigments (soot) | 30 parts |
| Dispersion additives (basic, high-molecular weight polymer; 40% in BuAc/methoxypropyl-acetate/butanol 3:2:1) | 4 parts |
| Adhesive layer 5: | |
| The following composition: | |
| Medium-molecular weight styrene resin (stickiness point 120–150° C.) | 15 parts |
| Methylethylketone | 35 parts |
| Butylacetate | 15 parts |
| Toluene 25 parts | |
| Pigments (soot) | 4 parts |
| $TiO_2$ | 4 parts |
| Filler ($SiO_2$) | 2 parts |

Figure 3:
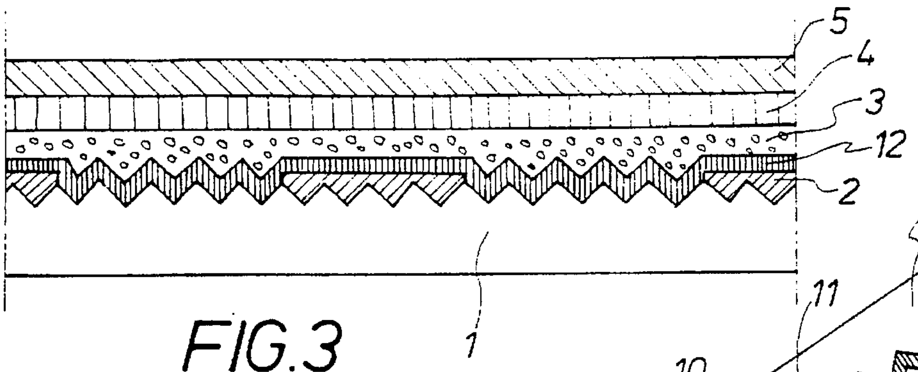
FIG. 3 is a view in section corresponding to FIG. 1 showing part of a second embodiment of a hot embossing foil according to the invention.
Figure 4:
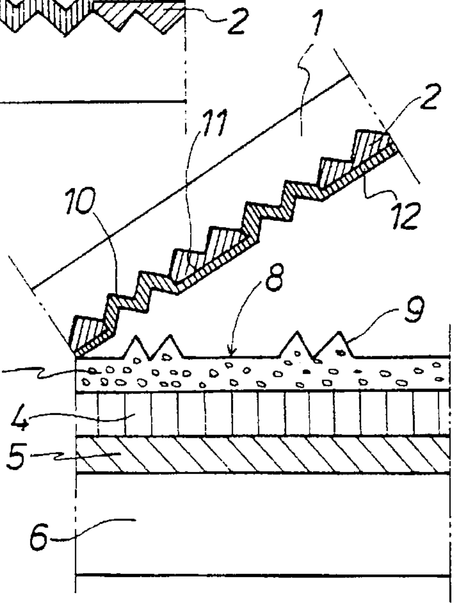
FIG. 4 is a view in section through a substrate with the hot embossing foil of FIG. 3 applied thereto.

Reference will now be made to FIGS. 3 and 4 showing a modified form of the embossing foil of FIGS. 1 and 2, the modified form additionally being provided with a release or partition layer 12. The layer 12 is disposed in the region of the surface 8 of the protective lacquer layer 3, which faces towards the backing film 1 and which, after the foil has been embossed on the substrate 6, forms the free surface. Therefore the release layer 12 covers on the one hand the surface 11 of the covering lacquer layer 2 which faces away from the backing film 1 and on the other hand in the regions in which there is no covering lacquer layer 2, it directly adjoins the surface 10 of the backing film 1, which boars a three-dimensional patterning.

The release layer 12 may exhibit a plurality of properties, depending on the respective function involved. For example, the purpose of the release layer 12 may only be that of permitting particularly simple separation of the backing film 1 bearing the covering lacquer layer 2, from the remainder of the embossing foil, after transfer thereof on to the substrate 6. A particularly important consideration however is that the shine properties of the surface 8 of the protective lacquer layer 3, which is the free surface of the foil after the embossing operation, can be influenced by way of the covering lacquer layer 12, that is to say, particularly in spite of the fact that the surface 8 of the protective lacquer layer 3 is formed in the embossing operation by the covering lacquer layer 2 on the one hand and the surface of the backing film 1 on the other hand, the surface 8 is of a uniform matt nature. In order to achieve that aim, the release layer 12 should exhibit very good adhesion in relation to the backing film 1 and the covering lacquer layer 2. Furthermore, in order to permit satisfactory manufacture of the embossing foil, it is important for the release layer 12 to exhibit very good resistance to solvents. In addition, to achieve the same purpose, there is a requirement for very good flow properties in order to ensure that the three-dimensional patterning of the surface 10 of the backing film 1 is maintained. The release layer 12 must also dry in such a way that its surface exhibits uniform matting. Very good resistance to temperature is also an important consideration.

The thickness of the release layer is preferably from 0.5–3 μm, more particularly being about 1 μm.

It may be formed for example by a lacquer of the following composition:

| | |
|---|---|
| Release lacquer 12: | |
| Hydroxyl-functional acrylic resin (OH-content about 8%) | 12 parts |
| Hexamethoxymethylmelamine resin (equivalent weight about 150 g/ml OH) | 12 parts |
| Xylol | 12 parts |
| Ethylacetate | 20 parts |
| Butanol | 20 parts |
| Diacetone alcohol | 20 parts |
| Acid catalyst (p-toluene sulfonic acid, 40% in isopropanol) | 4 parts |
| Matting agent: 1–10% relative to the total lacquer, depending on the desired degree of matting. | |

Figure 5:
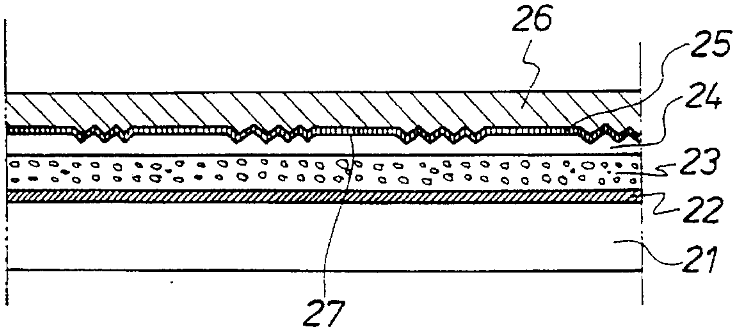
FIG. 5 is a view in section corresponding to FIGS. 1 and 3 through a third embodiment of a hot embossing foil according to the invention.
Figure 6:
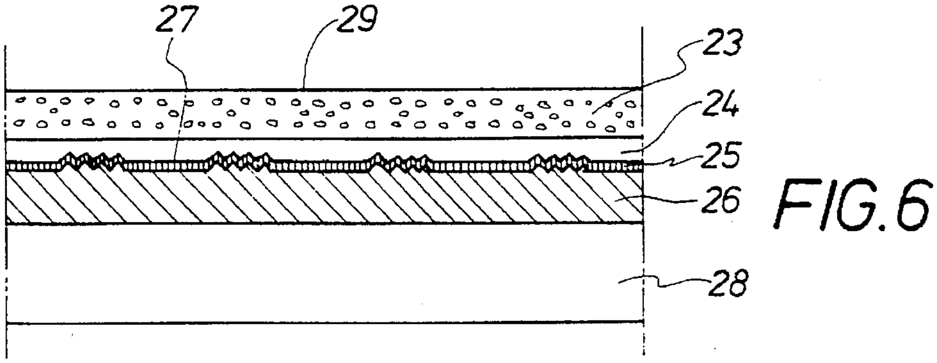
FIG. 6 is a view in section through a substrate with a hot embossing foil as shown in FIG. 5 applied thereto, with the backing film already having been removed.

Reference will now be made to FIGS. 5 and 6 showing an alternative form of a hot embossing foil which differs from the foils shown in FIGS. 1 through 4 insofar as the three-dimensional patterning is so arranged that, after transfer of the hot embossing foil on to a substrate, it does not form the surface of the decorated substrate. On the contrary, that surface is smooth when using a hot embossing foil as shown in FIG. 5.

The hot embossing foil illustrated in FIG. 5 includes the following layers:

21: A backing film with a smooth surface on both sides. This may be for example a polyester film of 6 through 100 μm, preferably 19 through 38 μm in thickness.

22: Separating layer. The function of the separating layer is to ensure satisfactory separation of the backing film and the layer of lacquer of the hot embossing foil after the embossing operation, without the exposed surface of the substrate which is decorated with the embossing foil being impaired. Generally the thickness of the separation layer is less than 1 μm.

23: Protective lacquer layer. This is a layer of lacquer of a thickness of 0.5 through 3 μm, preferably from 1.0 through 1.5 μm, the purpose thereof being to protect the surface of the substrate which is decorated with the embossing foil, without substantially impairing the appearance thereof. For that purpose the protective lacquer layer must have good chemical and physical resistance as well as very good transparency.

24: A layer which is deformable under the effect of heat. This layer is usually also a layer of lacquer of 0.3 through 2.0 μm, preferably about 1 μm, in thickness. It is transparent at any event and can be provided under the effect of heat and pressure with the three-dimensional patterning corresponding to the desired design, for example by means of a rolling procedure using a suitably patterned roller. In order to ensure that the three-dimensional patterning, once applied to the surface of the thermoplastic layer 24, which is remote from the backing film 21, is not altered or possibly even lost in the embossing operation, it is necessary to ensure that the temperature sensitivity of this layer is accurately matched to the temperatures used in the embossing operation. Layers which are thermally deformable at 100° through 180° C., preferably at about 140° C., are usually employed.

25: Reflective layer. The function of this layer is to ensure that the structuring of the thermally deformable layer 24 is particularly optically clear insofar as it refracts and reflects the incident light passing through the transparent layers 23 and 24. The reflecting layer is generally a metal or metal oxide layer, preferably for example an aluminium layer which is 0.001 through 1 μm, more preferably from about 0.005 through 0.05 μm in thickness. The layer is preferably applied by vapor deposit under high vacuum conditions, in which respect the metal layer may be applied prior to or after thermal deformation of the layer 24.

26: An adhesive layer which is substantially the same as the adhesive layer 5 of the hot embossing foils illustrated in FIGS. 1 through 4, both in regard to its properties and its function. In the FIG. 5 embodiment, the thickness of the layer 26 is 2 through 10, preferably 3 through 4 μm.

The separating layer 22, the protective lacquer layer 23, the thermally deformable layer 24 and the adhesive layer 26 may be of the following respective compositions:

| | |
|---|---|
| Separating layer 22: | |
| Wax (ester wax, dropping point 90° C.) | 0.05 parts |
| Toluene | 95 parts |
| Ethanol | 5 parts |
| Protective lacquer layer 23: | |
| High-molecular weight methylmethacrylate softening point 180° C. | 18 parts |
| Methylethylketone | 35 parts |
| Toluene | 40 parts |
| Diacetonealcohol | 7 parts |
| Thermally deformable layer 24: | |
| Methylmethacrylate, softening point about 180° C. | 30 parts |
| Styrene copolymer, softening point about 100° C. | 2 parts |
| Toluene | 20 parts |
| Ethylacetate | 35 parts |
| Butylacetate | 13 parts |
| Adhesive layer 26: | |
| Methyl/butylmethacrylate (softening point about 100–120° C.) | 8 parts |
| Polyvinylacetate, homopolymer (50% in ethanol) | 7 parts |
| Butyl methacrylate/methylmethacrylate copolymer 40% in xylol (softening point 80–100° C.) | 12 parts |
| Acetone | 18 parts |
| Toluene | 12 parts |
| Ethanol | 30 parts |
| Pigments ($TiO_2$) | 10 parts |
| Filler ($SiO_2$) | 3 parts |

In production of the hot embossing foil shown in FIG. 5, the separating layer 22, the protective lacquer layer 23 and the thermoplastically deformable lacquer layer 24 are successively applied to the backing film 21 which has a smooth surface on both sides. The protective lacquer layer 23 and the thermoplastically deformable lacquer layer 24 must both be transparent. It is also possible to provide only a single lacquer layer instead of the two layers 23, 24.

After the layers 22 through 24 have been applied to the backing film 21, a partial three-dimensional patterning effect is produced on the surface 27 of the thermoplastically deformable lacquer layer 24, which faces away from the backing film 21, by means of a suitably structured roller or in some other similar suitable fashion. Subsequently the surface 27 after deformation in that way has the reflecting layer 25 applied thereto by vapor deposit, whereupon the adhesive layer 26 is then applied in the usual fahsion.

As already mentioned, structuring of the surface 27 may occur only after the reflecting layer 25 has been applied. It is also possible to forego the reflecting layer 25 if there are sufficient optical differences between the adhesive layer 26 or a substrate 28 which is subsequently to be decorated with the embossing foil, and the thermoplastically lacquer layer 24, in order for the three-dimensional patterning to be perceptible in the region of the surface 27, even without the presence of a reflecting layer 25.

When, as shown in FIG. 6, the embossing foil is applied to a substrate 28, the free surface is formed by the smooth surface 29 of the protective lacquer layer 23 which faces towards the backing film 21 in the hot embossing foil. Therefore, when using an embossing foil as shown in FIG. 5, the result obtained is a decorated substrate 28 whose free surface 29 is smooth.

Finally it should be noted that considerable variations may be made in the embodiments of the invention as described and illustrated herein. In particular such possible variations are in respect of the coloring of the various layers of lacquer, while in that respect it is also possible to conceive of embodiments in which the layers of lacquer are not uniform over the entire area thereof. It would be possible for example for the layers of lacquer to be of different colors, for example corresponding to the three-dimensional patterning, in order in this way further to emphasise the effect of the partial three-dimensioning patterning. Furthermore, it will be appreciated that the embodiments of FIGS. 1 through 4 could also be provided with a reflecting layer which for example could replace the layer 4 of colored lacquer.

What is claimed is:

1. An embossing foil comprising a backing film, a decorative lacquer layer releasably disposed on the backing film, and an adhesive layer on the decorative lacquer layer at the side thereof remote from the backing film, said backing film provided with a 3-dimensional pattern being covered regionwise with a lacquer layer thereby to form a region-wise transferrable 3-dimensional patterning at a surface of said backing film.

2. The embossing foil as set forth in claim 1 and further including a release layer between said backing film having covered regionwised lacquer layers and said decorative lacquer layer.

3. The embossing foil as set forth in claim 1 wherein the surface of the decorative lacquer layer towards the backing film is a protective lacquer layer.

4. The embossing foil as set forth in claim 3 wherein said protective lacquer layer is transparent.

5. An embossing foil comprising a backing film, a decorative lacquer layer releasably disposed on the backing film, and an adhesive layer on the decorative lacquer layer at the side thereof remote from the backing film, said decorative lacquer layer including at least one transparent covering lacquer layer towards the backing film and provided with a regionwise three-dimensional patterning at its surface remote from the backing film, said regionwise three-dimensional patterning being provided by hot deformation at the surface of the transparent covering lacquer layer facing away from said backing film.

6. The embossing foil as set forth in claim 5 and further including a reflective layer between said transparent covering lacquer layer and said adhesive layer.

7. The embossing foil as set forth claim 6 wherein said reflective layer is formed of a metal.

8. The embossing foil as set forth claim 5 and further including a release layer between the backing film and the decorative lacquer layer.

9. The embossing foil as set forth claim 5 wherein a protective lacquer layer is disposed between said surface of said decorative lacquer layer and said backing film.

10. The embossing foil as set forth in claim 9 wherein said protective lacquer layer is transparent.

* * * * *